Reissued Mar. 18, 1947

Re. 22,854

UNITED STATES PATENT OFFICE 22,854

ABRASIVE COMPOSITION AND METHOD OF FORMING SAME

Hermann Kott, West Orange, N. J., and Murray Yawitz, New York, N. Y., assignors to Fish-Schurman Corporation, New York, N. Y., a corporation of New York No Drawing. Original No. 2,367,358, dated January 16, 1945, Serial No. 488,566, May 26, 1943. Application for reissue October 19, 1945, Serial No. 623,434

14 Claims. (Cl. 51—309)

This invention relates to abrasive compositions of matter and more particularly to abrasive and cutting tools wherein the abrasive material utilized therein consists of small particle sized diamonds and has for its object the provision of a method of producing such abrasive and cutting tools.

Another object is to provide an improved abrasive or cutting tool wherein the abrasive material incorporated within the tool consists of small particle sized diamonds.

Still another object is to provide an improved grinding tool for use in the grinding of glass lens blanks.

Other objects will be apparent as the invention is more fully hereinafter disclosed.

In the forming of abrasive and cutting tools from small particle sized diamonds, that is, diamonds having a particle size below about 120 mesh, the major problem involved is to provide a cementing matrix to hold the plurality of diamond particles together which will tenaciously adhere to the diamond surface and at the same time provide strength and rigidity to the tool.

Heretofore in the art many attempts have been made to provide an abrasive and cutting tool wherein the abrasive employed consists of small particle sized diamonds. None of the methods proposed or matrix materials employed, however, has been wholly satisfactory. The present invention aims to provide an abrasive and cutting tool consisting of small particle sized diamonds bonded together by a metallic matrix which is strong and durable and in which the diamond particles are tenaciously retained by an intermetallic bond between a metal surface firmly adherent onto the surface of the diamond particle and the metallic constituent of the matrix.

In accordance with the present invention the problem is solved by first surfacing the diamond particles with a firmly adherent relatively thin film layer of a metal of the platinum group by electronic deposition in accordance with the invention described and claimed in Patent No. 2,103,623, granted December 28, 1937, to Hermann Kott, one of the co-inventors of the present invention, and thereafter bonding the diamond particles together with an iron-carbon alloy containing about .87% carbon at a temperature above the eutectoid temperature of 725° C., but below the temperature at which the diamond will be deleteriously affected (about 800° C.), to obtain a cementing bond between the diamond particles consisting mainly of the iron-carbon alloy in the austenitic condition having a solubility for the platinum metal surface on the diamond at the temperature of heating, thereby bonding the diamond to the iron-carbon matrix by an intermetallic bond and then quenching the resultant cemented product to convert the austenite of the iron-carbon alloy into martensite, thereby to obtain a relatively hard iron-carbon structure in the bonding matrix, which subsequently may be tempered, if desired, to the desired strength or hardness by the usual tempering heat-treatment methods heretofore employed in the art of steel treating.

Heretofore in the art it has been known that the platinum group metals possess the property of imparting great hardness and strength to iron and to iron-carbon alloys when present therein in amounts as low as .50%. In the present invention, by first providing a firmly adherent film of the platinum group metal upon the surface of the diamond by electronic deposition in accordance with the invention of said Kott patent and thereafter heating the surface coated diamond embedded in finely divided particles of an iron-carbon alloy having a carbon content which at a temperature between 725° C. and 800° C. will induce the formation of austenite, the time interval of heating to obtain surface alloying of the platinum group metal with the iron-carbon alloy particles adjacent the diamond surface and firm bonding of the same thereto, and sintering of the iron-carbon alloy particles together to form a coherent metallic mass is materially shortened. Then by rapidly cooling the cemented product the austenite formed at the temperature of heating is converted to martensite and may thereafter be annealed to any desired strength and hardness, as heretofore practiced in the art of tempering hardened steel.

As an example of the practice of the present invention, but not as a limitation thereof, we will describe the invention as it has been adapted to the forming of a lens grinding tool. Lens grinding tools are annular in shape, the inner annular edge thereof being beveled off to provide the desired concave surface in the case of grinding convex lenses or the outer edge beveled off to provide the desired convex surface in the case of grinding concave lenses. The diameter of the annular tool may be varied widely depending upon the size of lens to be ground. Usually the tool is mounted upon the end of a revoluble spindle mounted to be axially rotated and arranged to be brought into pressure engagement with the surface of the lens blank which is fixedly mounted with its surface lying in a plane transverse to the plane of spindle rotation.

A common size of lens grinding tool is one having an outside diameter of about 2", and inside diameter of about 1½", and a height of about ½". This size tool is adapted to grind concave or convex lenses as small as 2" up to as large as 3".

In accordance with the present invention, the diamonds crushed to pass 100 mesh, but not passing 120 mesh, are thoroughly cleaned of surface dirt and grease and freed from associated impurities, and are provided with a firmly adherent relatively thin film of the platinum group metal rhodium in accordance with the invention of said Patent No. 2,103,623 of December 28, 1937.

The particular voltage employed to obtain a firmly adherent film of the metal rhodium upon the surface of the diamond will vary widely without essential departure from the present invention, depending upon the particular conditions of electronic projection involved. In an apparatus similar to the type illustrated in Fig. 9 of the said patent wherein in place of the arrangement including plates 20 and grid 9 is provided a revolvable mesh cage within which the plurality of diamonds to be coated are disposed, the electronic projection of the rhodium is continued until the surfaces of all of the diamond particles have been coated to a depth of at least $1\times10^{-3}$ millimeters, the projection voltage being adjusted under any given conditions to obtain the degree of adherence desired, which depends in part upon the distance of projection, as one skilled in the art will perceive from the disclosure of said patent.

Following surface coating as hereinabove described, the coated diamonds are mixed with finely divided iron-carbon alloy containing approximately .87% carbon, the mixture is poured in an annular mold and is compacted to the extent desired and the compacted mixture is heated under substantially non-oxidizing conditions and in the absence of hydrogen or nitrogen to a temperature above the eutectoid temperature of 725° C., but below 800° C., for a time interval adapted to convert the iron-carbon alloy entirely to the austenitic condition and to cement the finely divided iron particles together and to form an intermetallic bond between the rhodium and the cemented austenitic iron-carbon particles.

This time interval of heating varies widely depending upon the particle size of the iron-carbon alloy and upon the contact pressure therebetween and between the metal surfaced diamond particles present in the mixture. In general, as the particle size of the iron-carbon alloy decreases the amount of contact pressure required between the particles decreases, until as the particle size of the alloy approaches 1 to 5 microns cementation may be obtained with very low contact pressure. Very high contact pressures are undesirable for two reasons. The first reason is that most iron powders contain surface adsorbed gas and also contain a certain amount of iron oxide which, during the heating, is reduced and expelled as CO gas which requires that the compacting pressure, with any given particle size of iron powder, must be below that which prevents the escape of these evolved gases. In general, with the extremely small particle size iron powders preferred (passing 400 mesh) compacting pressures not in excess of 10 to 20 pounds per square inch are preferred. With coarser particle sized iron particles or where the particle size of the iron powder varies widely from large to small, higher pressures are desirable.

The second limitation on pressure is the crushing pressure of the diamond and the pressure required to break the thin film of platinum group metal surfacing the diamond. Direct contact of the diamond with the iron is undesirable.

As an illustration, the best form of iron-carbon alloy to be employed appears to be the form which is obtained by the thermal decomposition of iron carbonyl, known in the art as carbonyl iron powder. This type of iron powder heretofore has been employed in the manufacture of electromagnetic devices. As commercially prepared, carbonyl iron powder comes in several different grades, the difference between the grades mainly consisting of differences in the carbon and oxygen content, all of the grades, however, being characterized by spheroidal particles of a size passing 400 mesh.

We have found that by employing this type of iron powder and incorporating therein sufficient additional carbon in the form of finely divided substantially pure sugar carbon, to provide for the substantially complete removal of the oxygen content of the iron as carbon monoxide and for an excess of carbon approximating .87%, a mixture of this iron powder and carbon with the metal surfaced diamonds, sinters readily at temperatures within the range 725°–800° C. within a relatively short time interval approximating three hours with extremely small compacting pressures to form a dense, coherent metalliferous body wherein the diamonds are firmly bonded to the metal matrix. By quenching this sintered body from the sintering temperature to quench harden the austenitic iron matrix and then reheating the quench hardened matrix to a temperature within the range 300°–700° C. to soften to any desired intermediate hardness the strength and rigidity of the same may be widely varied.

The relative proportions of diamonds to iron powder employed in the practice of the present invention may be varied widely without essential departure from the same, depending upon the nature of the grinding, cutting or abrasive tool being produced. In the case of the lens grinding tool, we have found it desirable to employ a ratio of 1 part diamonds (particle size passing 100 mesh but not passing 120 mesh) to 10 parts iron. This ratio, however, may be widely varied without detrimental results or essential departure from the present invention.

In the production of the lens grinding tool, the mixture consisting of the metal surfaced diamonds and carbonyl iron powder with carbon at least sufficient to remove all of the oxygen contained in the iron and to provide .87% carbon in the sintered iron product, is poured into an annular mold, preferably one consisting of heat-resistant metal surfaced interiorly with an inert refractory, such as aluminum oxide, and is tamped down therein, using moderate tamping pressure to uniform thickness or height in the mold, and the mold is heated under conditions excluding oxidation, hydrogen and nitrogen, such as, for example, under a positive pressure of carbon monoxide, to a temperature approximating 750°–760° C. for a time interval of 1 to 5 hours, preferably about 2½ to 3 hours.

At the conclusion of this time interval the sintered product is cooled rapidly as by quenching, following which the quenched product may be tempered by heating under a positive pressure of carbon monoxide to a tempering temperature within the range 300° to 700° C. to soften the iron matrix to the desired intermediate hardness.

Lens grinding tools constructed in accordance with the present invention, as hereinabove described, have shown exceptionally long life. One tool, for example, being employed in the grinding of over 2000 lenses without evidencing any loss in efficiency and without the grinding surface wearing down more than 1/64 of an inch. This is far superior to any other lens grinding tool at present available in the art.

In the practice of the present invention, it is believed apparent to one skilled in the art that, whereas the maximum temperature of heating to effect sintering of the metal surfaced diamond-iron-carbon alloy powder is limited by the maximum temperature to which the diamond may be safely heated, which approximates 800° C. with the small sized diamonds employed, the carbon content of the iron-carbon alloy employed may be varied above and below the eutectoid percentage .87% within the range .45% to 1.0% depending upon the temperature of heating, and that at 800° C. either .45% or 1.0% carbon may be employed depending upon the hardness desired in the subsequently quenched sintered product. As the temperature of heating decreases below 800° C. the range of permissible carbon content decreases until at 725° C. the amount of carbon must closely approximate the eutectoid percentage of .87%.

It is further believed apparent to one skilled in the art that in place of rhodium we may employ any of the platinum metals, as each of these metals are characterized by having a low solubility in gamma iron at the temperature of heating (725°–800° C.) during sintering to form a high melting strong alloy bond between the metal surfaced diamond and the sintered iron particles lying next adjacent the surfaced diamond. Moreover, the platinum metals are each characterized by being non-reactive with carbon and for that reason non-deleterious to the normal phase change reactions of the iron-carbon alloy employed, upon which the strength and rigidity of the sintered product depends. Further, the platinum metals under the condition of heating maintain substantially clean metal surfaces adapting the same to relatively rapid surface welding with the iron particles in light to heavy pressure contact therewith.

Having hereinabove described the present invention generically and specifically and given one specific example of the practice of the same, it is believed apparent that the same may be widely varied without essential departure therefrom and all such modifications and departures are contemplated as may fall within the scope of the following claims.

What we claim is:

1. An abrasive composition of matter consisting of small sized diamond particles dispersed throughout a metallic matrix, the said metallic matrix consisting of an iron-carbon alloy containing carbon within the range .45% to 1.0% and the said diamonds being secured and retained in said matrix, by a relatively thin film surface coating of a platinum group metal mechanically adherent to the diamond surface on one side and alloy bonded to the iron-carbon alloy matrix on the opposite side.

2. An abrasive composition of matter consisting of small sized diamond particles dispersed throughout a metallic matrix, the said metallic matrix consisting of an iron-carbon alloy containing carbon within the range .45%–1.0% and the said diamonds being secured and retained in said matrix by a relatively thin film surface coating of rhodium mechanically adherent to the diamond surface on one side and alloy bonded to the iron-carbon alloy matrix on the opposite side.

3. A grinding tool provided with an abrasive surface consisting of small size diamond particles dispersed throughout a metallic matrix, said matrix consisting of an iron-carbon alloy containing carbon within the range .45%–1.0% and the said diamonds being secured and retained in said matrix by a relatively thin film surface coating of a platinum group metal mechanically adherent to the surface of the diamond and alloy bonded to the iron-carbon matrix adjacent the opposite face thereof.

4. The method of setting diamonds in a metallic matrix consisting of sintered metal powders consisting of iron containing about the eutectoid percentage of carbon, which comprises surfacing the diamond with a relatively thin film of a refractory metal of the platinum group of metals, embedding the surfaced diamond in a mass of iron metal powder containing carbon within the range .45%–1.0% and heat-treating the said mass under non-oxidizing conditions to a sintering temperature above about 725° C., at which the said iron is converted substantially into its austenitic form but not in excess of a temperature approximating 800° C. for a time interval adapted to sinter the mass to the desired density and rapidly cooling the sintered mass to atmospheric temperature.

5. The method of setting diamonds in a metallic matrix consisting of sintered iron metal powder containing .45%–1.0% C, which comprises surfacing the diamond with a mechanically adherent thin film layer of a non-carbide forming refractory metal of the platinum group, embedding the surfaced diamond in a mass of carbonyl iron metal powder containing .45%–1.0% C, and heating the said mass under non-oxidizing conditions to a temperature within the range 725°–800° C., at which the said iron and carbon is converted into austenite for a time interval adapted to obtain a sintering of the said metal powder to the desired density, and rapidly cooling the sintered mass to atmospheric temperatures.

6. The method of setting diamonds in a sintered metallic body consisting principally of iron and containing about the eutectoid percentage of carbon, which comprises surfacing the diamond with a mechanically adherent coating of rhodium, embedding the diamond in a mass of iron metal powder containing carbon within the range .45%–1.0%, heat-treating the said mass in an atmosphere substantially free of oxygen to a temperature above about 725° C. but below about 800° C. at which the said iron and carbon is converted into austenite for a time interval sufficient to sinter the said mass to the desired density, and rapidly cooling the said sintered mass to atmospheric temperatures.

7. The method of forming abrasive compositions of matter consisting of diamond particles dispersed in a metallc matrix consisting of iron containing the eutectoid percentage of carbon which comprises forming a mixture consisting of diamond particles and metal powder, said diamond particles being surfaced with a mechanically adherent coating of a platinum group metal and said metal powder consisting of an iron and carbon containing carbon within the range .45%–

1.0%, molding the mixture to the approximate size, shape and configuration desired, and heating the molded product to temperatures within the range 725°–800° C. for a time interval at least sufficient to convert the iron-carbon alloy content of the mixture to austenite and to sinter the metal particles together into a coherent metal body, and rapidly cooling the sintered metal body to atmospheric temperatures.

8. The method of making a diamond tool having a body comprising matrix material and diamonds anchored to the matrix material which comprises cleaning the surfaces of the diamonds, depositing on the cleaned diamond layers of metal in the form of very small particles under sub-atmospheric pressure, then placing the diamonds in matrix material, and bonding their metal layers to the matrix material.

9. The method of making a diamond tool having a body comprising matrix material and diamonds anchored to the matrix material which comprises cleaning the surfaces of the diamonds, depositing on the cleaned diamonds layers of metal in molecular form under sub-atmospheric pressure, then placing the diamonds in matrix material, and bonding their metal layers to the matrix material.

10. The method of making a diamond tool having a body comprising metal matrix material and diamonds anchored to the metal matrix material which comprises connecting a cathode and an anode to a source of electric energy with the cathode carrying metal and with both the cathode and anode under sub-atmospheric pressure to transfer metal in molecular form from the cathode to the diamonds, then positioning the diamonds in metal matrix material, and bonding the metal deposited on the diamonds to the metal matrix material.

11. The method of making a diamond tool which comprises coating the diamonds with metal in molecular form under sub-atmospheric pressure and thereby bonding the coating metal to the diamonds, placing the coated diamonds in matrix material, and bonding the coating metal to the matrix material.

12. The method of making a diamond tool which comprises agitating the diamonds and during their agitation completely coating the diamonds with metal in molecular form under sub-atmospheric pressure, placing the diamonds in matrix material, and bonding the coating metal to the matrix material.

13. The method of making a diamond tool having a body comprising metal matrix material and diamonds anchored to the metal matrix material which comprises bonding metal to the diamonds by depositing on the diamonds metal in molecular form under sub-atmospheric pressure, and then bonding the metal on the diamonds to metal matrix material having an affinity for the metal on the diamonds and forming the body by subjecting the diamonds and metal matrix material to heat and pressure.

14. The method of making a diamond tool having a body comprising metal matrix material and diamonds anchored to the metal matrix material, which comprises agitating the diamonds and during their agitation connecting a cathode and an anode to a source of electric energy with the cathode carrying metal and with both the cathode and anode under sub-atmospheric pressure to transfer metal in molecular form from the cathode to the diamonds to completely coat the diamonds, and then bonding the metal deposited on the diamonds to the metal matrix material.

HERMANN KOTT.
MURRAY YAWITZ.

REFERENCES CITED

The following references are of record in the file of this patent:

UNITED STATES PATENTS

| Number | Name | Date |
|---|---|---|
| 1,584,728 | Case | May 18, 1926 |
| 2,306,423 | Bernstorff et al. | Dec. 29, 1942 |
| 2,347,920 | Mays | May 2, 1944 |
| 604,569 | Ringstrom | May 24, 1898 |
| 2,145,888 | Moulton et al. | Feb. 7, 1939 |
| 2,170,164 | Stone et al. | Aug. 22, 1939 |
| 2,228,871 | De Bats | Jan. 14, 1941 |
| 2,173,835 | Boyer et al. | Sept. 26, 1939 |
| 1,524,218 | Smith et al. | Jan. 27, 1925 |
| 1,625,463 | Gauthier | Apr. 19, 1927 |

OTHER REFERENCES

Berghause et al., A. P. C. publication 233,139, May 18, 1943.